United States Patent
Chaouk et al.

[11] Patent Number: 6,160,030
[45] Date of Patent: Dec. 12, 2000

[54] HIGH WATER CONTENT POROUS POLYMER

[75] Inventors: Hassan Chaouk, Brighton; Gordon Francis Meijs, Murrumbeena, both of Australia

[73] Assignee: Novartis AG, Basel, Switzerland

[21] Appl. No.: 09/155,551

[22] PCT Filed: Mar. 20, 1997

[86] PCT No.: PCT/EP97/01410

§ 371 Date: Mar. 25, 1999

§ 102(e) Date: Mar. 25, 1999

[87] PCT Pub. No.: WO97/35906

PCT Pub. Date: Oct. 2, 1997

[30] Foreign Application Priority Data

| Apr. 4, 1996 | [AU] | Australia | PN9145 |
| Apr. 4, 1996 | [AU] | Australia | PN9146 |
| Sep. 30, 1996 | [EP] | European Pat. Off. | 96810644 |

[51] Int. Cl.$^7$ .................................................. C08G 18/50
[52] U.S. Cl. .............................. 521/145; 521/63; 521/64; 521/88; 521/144; 521/149; 521/154
[58] Field of Search ................................. 521/63, 64, 88, 521/144, 145, 149, 154

[56] References Cited

U.S. PATENT DOCUMENTS

| 5,475,078 | 12/1995 | Sato et al. | 528/16 |
| 5,945,498 | 8/1999 | Hopken et al. | 528/42 |

FOREIGN PATENT DOCUMENTS

| 084406 | 1/1983 | European Pat. Off. . |
| 136102 | 1/1983 | European Pat. Off. . |
| 292325 | 5/1986 | European Pat. Off. . |
| 216622 | 9/1986 | European Pat. Off. . |
| 250767 | 4/1987 | European Pat. Off. . |
| 303876 | 7/1988 | European Pat. Off. . |
| 320023 | 12/1988 | European Pat. Off. . |
| 622353 | 4/1994 | European Pat. Off. . |
| 712882 | 10/1995 | European Pat. Off. . |
| 1317682 | 6/1971 | United Kingdom . |
| 96/31546 | 10/1996 | WIPO . |
| 96/31547 | 10/1996 | WIPO . |

*Primary Examiner*—John M. Cooney, Jr.
*Attorney, Agent, or Firm*—R. Scott Meece; Robert J. Gorman, Jr.

[57] ABSTRACT

The present invention relates to porous polymers comprising a perfluoropolyether unit, to a process for producing such porous polymers, in particular to a process for polymerising or copolymerising monomers incorporating perfluoropolyethers to form porous polymers, to articles made of or comprising porous polymers comprising a perfluoropolyether unit, such as membranes or ophthalmic devices, and to the use of porous polymers comprising perfluoropolyether units as articles, such as membranes or ophthalmic devices. The perfluoropolyether units are preferably of the formula (PFPE):—$OCH_2CF_2O(CF_2CF_2O)_x(CF_2O)_yCF_2CH_2O$— wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000. The porous polymers comprising one or more perfluoropolyether units having a water content when fully swollen in water which is higher than that of the same polymer if polymerized under conventional conditions, and are suitable for application, e.g., as soft contact lenses.

18 Claims, No Drawings

HIGH WATER CONTENT POROUS POLYMER

The present invention relates to porous polymers comprising a perfluoropolyether unit, to a process for producing such porous polymers, in particular to a process for polymerising or copolymerising monomers incorporating perfluoropolyethers to form porous polymers, to articles made of or comprising porous polymers comprising a perfluoropolyether unit, such as membranes or ophthalmic devices, e.g. contact lenses, and to the use of porous polymers comprising perfluoropolyether units as articles, such as membranes or ophthalmic devices, e.g. contact lenses.

In many applications it has been found advantageous for polymers to be porous. The degree of porosity required depends on the application. For example, membrane filtration depends on the use of microporous polymers to effect separations of various materials. Also macroporous sheets of chemically resistant polymers find extensive use as cell dividers in cells for electrolysis or electricity storage.

Pores may be formed in the polymer during the process of manufacturing an article of the desired shape or may be formed in the article after manufacture. There are a variety of methods known in the art for the introduction of porosity into synthetic polymers, such as those described in WO 90/07575, WO 91/07687, U.S. Pat. No. 5,244,799, U.S. Pat. No. 5,238,613, or U.S. Pat. No. 4,799,931. Some rely on a drilling or etching process after the polymer has been formed. Thus, high energy particles or electromagnetic radiation, such as that emitted from lasers, have been used as described in WO 91/07687. These processes are generally labour intensive and time consuming.

Less commonly, the porosity may be an inherent property of the polymer and the porosity maintained as the polymer is formed into the desired shape for a particular application. It is particularly advantageous for the porosity to be introduced during the polymer forming steps. This is generally economical and, in appropriate cases, good control over the porosity and pore size can be achieved.

Polymers based on perfluoropolyethers, in general, have many unique and desirable properties. These include resistance to fouling by proteinaceous and other materials, outstanding flexibility, transparency, high resistance to temperature extremes, and exceptional chemical and oxidation resistance. These properties would make perfluoropolyether based polymers particularly suitable for a variety of applications and would be particularly suited for use as membranes if methods were available for the economic introduction of porosity. Indeed, there has been a long-felt need for membrane materials with the above attributes. Polytetrafluoroethylene-based (PTFE) membrane materials provide a partial solution to this need. However, unlike perfluoropolyether-based polymers, which can be readily cured and formed into articles by in-situ polymerisation, PTFE-based materials suffer from the disadvantage of being difficult to fabricate and manufacture into articles. In addition, stretching processes such as those described in U.S. Pat. No. 3,953,566 (Gore) give a somewhat limited range of size and shape of the porosities and are difficult to control.

Because of the properties mentioned above perfluoropolyether based polymers are highly desirable materials for contact lenses and other ophthalmic devices (U.S. Pat. No. 4,440,918, U.S. Pat. No. 4,818,801); if such materials could be made porous to allow transfer of tear fluids or nutrients their usefulness would be considerably enhanced.

Despite the obvious potential advantages of these materials, porous perfluoropolyether polymers have not previously been available.

In certain polymers porosity may be an interpenetrating network of holes, closed cells or a combination thereof. This may be achieved by polymerization in the presence of an insoluble material often referred to as a porogen. Subsequent leaching of the porogen gives rise to interstices throughout the formed polymer material. Sodium chloride is one such material that has been used. A disadvantage of this process is the difficulty of stabilising the suspension of porogen in the polymerisation mixture. Unstable suspensions can lead to an inhomogeneous and unacceptable product. In many cases, extensive optimisation of the viscosity of the system and the type of porogen is needed to obtain a satisfactory result. In addition the procedure is limited in terms of the availability of porogens suitable for introducing the desired ranges of pore sizes.

A convenient and versatile method of obtaining porous materials is the polymerisation of co-continuous microemulsions. Microemulsion polymerisation involves the polymerisation of a stable isotropic mixture of an oil phase and a water phase stabilized by surfactants. The oil phase generally contains the polymerisable monomer, which polymerises around either contiguous droplets of the water phase stabilized by surfactants or about a co-continuous water phase. Typically, organic solvents are not used in the water phase.

It will be appreciated that porous materials derived from perfluoropolyethers possess unusual characteristics in their interaction with other substances. An unusually low surface energy is one such characteristic. The low surface energy and low propensity to adsorb many common materials is, in part, responsible for their outstanding resistance to fouling and degradation and the utility of fluoropolymers in applications requiring soiling resistance or non-stick properties. A consequence of the low surface energy and solubility of fluorochemicals, is that stable emulsions and microemulsions in aqueous and other common media are very difficult to achieve. For example, standard surfactants well-known in the art are ineffective in stabilising aqueous microemulsions containing perfluoropolyethers. Accordingly, standard procedures for making microemulsions are ineffective for perfluoropolyether-based monomers.

It is an object of the present invention to provide porous polymers comprising one or more perfluoropolyether units having a water content when fully swollen in water which is higher than that of the same polymer if polymerized under conventional conditions.

It is a further object of the present invention to provide porous polymers comprising one or more perfluoropolyether units characterized in that the water content of said polymer, when fully swollen in water, is above 23 weight percent.

It is a further object of the present invention to provide porous polymers comprising one or more perfluoropolyether units which are either homopolymers or copolymers with a hydrophobic comonomer characterized in that the water content of said polymer, when fully swollen in water, is above 5 weight percent.

It is a still further object of the invention to provide articles made of one or more of the above mentioned porous polymers, or comprising one or more of the above mentioned porous polymers, which articles may be for example membranes or ophthalmic devices, such as, preferably, contact lenses.

It is another object of the invention to provide processes for the manufacture of the above mentioned porous polymers.

More specifically, the invention is directed to a porous polymer comprising at least one macromonomer having one or more perfluoropolyether units characterized in that the water contents of said polymer, when fully equilibrated with water, is above 23 weight percent. A preferred range of water content is 25 to 60 weight %, an even more preferred range is 30 to 55 weigt %.

In addition, the invention is directed to a porous polymer which is a homopolymer of at least one macromonomer having one or more perfluoropolyether units or a copolymer of such macromonomer with a hydrophobic comonomer characterized in that the water contents, when fully equilibrated with water, is above 5 weight percent. A preferred range of water content is 5 to 60 weight of an even more preferred range is 10 to 55 weight and a very preferred range is 25% to 52 weight %

In a preferred embodiment the polymerizable component includes at least one macromonomer having at least one perfluoropolyether unit. It will be understood by those skilled in the art that the terms "perfluoropolyether unit" and "PFPE unit" mean preferably a moiety of formula PFPE:

$$—OCH_2CF_2O(CF_2CF_2O)_x(CF_2O)_yCF_2CH_2O— \qquad (PFPE)$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000. Preferably x in Formula (PFPE) is in the range of from 0 to 20, more preferably in the range from 8 to 12, and y is in the range from 0 to 25, more preferably in the range from 10 to 14. Even more preferred, x and y in Formula (PFPE) are both different from zero such that x is in the range of from 1 to 20, more preferably in the range from 8 to 12, and y is in the range from 1 to 25, more preferably in the range from 10 to 14.

Preferred macromonomers having at least one perfluoropolyether unit include, but are not limited to, those of formula I, II and III as specified hereinafter:

Macromonomers of formula (I):

$$Q\text{-}(PFPE\text{-}L)_{n-1}\text{-}PFPE\text{-}Q \qquad (I)$$

macromonomers of formula (II):

$$Q\text{-}B\text{-}(L\text{-}B)_n\text{-}T \qquad (II)$$

and macromonomers of formula (III)

$$Q\text{-}PFPE\text{-}L\text{-}M\text{-}L\text{-}PFPE\text{-}Q \qquad (III)$$

wherein in these formulae

Q may be the same or different and is a polymerizable group,
PFPE is a divalent residue of formula (PFPE) as hereinbefore defined,
L is a difunctional linking group;
n is at least 1;
in macromonomers of formula (II) each B may be the same or different and is a difunctional block of molecular weight in the range of from 100 to 4000 and wherein at least one B is a perfluorinated polyether of formula (PFPE);
in macromonomers of formula (II) T is a univalent terminal group which is not polymerisable by free radicals but which may contain other functionality; and
in macromonomers of formula (III) M is a residue from a difunctional polymer or copolymer comprising silicone repeat units of formula IV having a molecular weight preferably in the range of from 180 to 6000 and end functionality as described below

wherein $R^1$ and $R^2$ may be the same or different and are selected from the group consisting of hydrogen, alkyl, aryl, halosubstituted alkyl and the like. $R^1$ and $R^2$ are preferably methyl.

As mentioned, one embodiment of the invention is directed to a porous polymer comprising at least one macromonomer having one or more perfluoropolyether units characterized in that the water contents of said polymer, when fully equilibrated with water, is above 23 weight percent. Such a porous polymer is preferably a copolymer of one or more macromonomers having one or more perfluoropolyether units, preferably of formula I, II or III, with one or more hydrophilic comonomers, or with a mixture of a hydrophobic and a hydrophilic comonomer in which mixture the hydrophilic comonomer has a higher weight percentage than the hydrophobic comonomer. Polymers based on macromonomers and only hydrophilic comonomers are preferred in this context. Examples of preferred comonomers are provided hereinafter.

As also mentioned, another embodiment of the invention is directed to a porous polymer which is a homopolymer of at least one macromonomer having one or more perfluoropolyether units or a copolymer of such macromonomer with a hydrophobic comonomer characterized in that the water contents, when fully equilibrated with water, is above 5 weight percent. In this case the polymer is either a homopolymer of a single macromonomer having one or more perfluoropolyether units, or it is an interpolymer of more than one macromonomers having one or more perfluoropolyether units, or it is a copolymer of one or more macromonomers having one or more perfluoropolyether units, preferably of formula I, II or III, with one or more hydrophobic comonomers, or with a mixture of a hydrophobic and a hydrophilic comonomer in which mixture the hydrophobic comonomer has a higher weight percentage than the hydrophilic comonomer. Polymers based on macromonomers and only hydrophobic comonomers are preferred in this context. Examples of preferred comonomers are provided hereinafter.

One of the essential distinctive features of the present invention is that the porous polymers comprising one or more perfluoropolyether units have a water content when fully swollen in water which is higher than that of the same polymer if polymerized under conventional conditions. This definition is to be understood in the context of this invention in that the claimed porous polymers do have their porosity, and the higher water content resulting therefrom, in the absence of any mechanical process steps following the polymerization step, such as mechanical drilling or etching steps. "Conventional conditions" is understood to mean those conditions which have been disclosed already for polymerization of polymers comprising perfluoropolyether units. In order to further illustrate the "conventional conditions" it is to be understood that said conditions most preferably exclude any porosity promoting conditions, while porosity promoting conditions are chosen for making the porous polymers of the present invention.

Such porosity promoting conditions are, essentially, use of porogens during polymerization, polymerization starting from co-continuous microemulsions, or selection of a solvent which forms a homogenous solution with the components to be polymerized, but displays the effect of forming a discrete phase during or at the end of the polymerization which discrete organic solvent phase forms an interpenetrating network throughout the mixture or is dispersed through the mixture. In contrast thereto, the "conventional conditions" referred to hereinbefore and hereinafter, define essentially a polymerization process which is conducted starting from a homogenous phase, e.g. from a homogenous solution in an organic solvent of the components to be polymerized, which phase remains a homogenous phase (then the polymer formed is a soluble polymer), or which homogenous phase is transformed into a solvent phase and, separately therefrom, a continuous polymer phase at the end of the polymerization (then the polymer formed is a polymer which is unsoluble in the chosen solvent). Typical examples of "conventional conditions" are provided in comparative examples 13 and 14.

In the above formulae I, II and III, respectively, the following definitions apply:

It is preferred that n is in the range of from 1 to 5, more preferably n is in the range of from 1 to 3. Macromonomers where n is 1 are particularly preferred.

Q is a polymerizable group which preferably comprises an ethylenically unsaturated moiety which can enter into a free radical polymerization reaction. Preferably Q is a group of the formula A

$$P_1-(Y)_m-(R'-X_1)_p-\quad\quad (A)$$

wherein $P_1$ is a free-radically-polymerizable group;

Y is —CONHCOO—, —CONHCONH—, —OCONHCO—, —NHCONHCO—, —NHCO—, —CONH—, —NHCONH—, —COO—, —OCO—, —NHCOO— or —OCONH—;

m and p, independently of one another, are 0 or 1;

R' is a divalent radical of an organic compound having up to 20 carbon atoms;

$X_1$ is —NHCO—, —CONH—, —NHCONH—, —COO—, —OCO—, —NHCOO— or —OCONH—.

A free-radically-polymerizable group $P_1$ is, for example, alkenyl, alkenylaryl or alkenylarylenealkyl having up to 20 carbon atoms. Examples of alkenyl are vinyl, allyl, 1-propen-2-yl, 1-buten-2-, -3- and -4-yl, 2-buten-3-yl, and the isomers of pentenyl, hexenyl, octenyl, decenyl and undecenyl. Examples of alkenylaryl are vinylphenyl, vinylnaphthyl or allylphenyl. An example of alkenylarylenealkyl is o-, m-, or p-vinylbenzyl.

$P_1$ is preferably alkenyl or alkenylaryl having up to 12 carbon atoms, particularly preferably alkenyl having up to 8 carbon atoms, in particular alkenyl having up to 4 carbon atoms.

Y is preferably —COO—, —OCO—, —NHCONH—, —NHCOO—, —OCONH—, NHCO— or —CONH—, particularly preferably —COO—, —OCO—, NHCO— or —CONH—, and in particular, —COO— or —OCO—.

$X_1$ is preferably —NHCONH—, —NHCOO— or —OCONH—, particularly preferably —NHCOO— or —OCONH—.

In a preferred embodiment, the indices, m and p, are not simultaneously zero. If p is zero, m is preferably 1.

R' is preferably alkylene, arylene, a saturated bivalent cycloaliphatic group having 6 to 20 carbon atoms, arylenealkylene, alkylenearylene, alkylenearylenealkylene or arylenealkylenearylene.

Preferably, R' is a divalent radical having up to 12 carbon atoms, particularly preferably a divalent radical having up to 8 carbon atoms. In a preferred embodiment, R' is furthermore alkylene or arylene having up to 12 carbon atoms. A particularly preferred embodiment of R' is lower alkylene, in particular lower alkylene having up to 4 carbon atoms.

It is particularly preferred that Q be selected from the group consisting of acryloyl, methacryloyl, styryl, acrylamido, acrylamidoalkyl, urethanemethacrylate or any substituted derivatives thereof. Most preferably Q is a compound of formula A wherein $P_1$ is alkenyl of up to 4 carbon atoms, Y is —COO—, R' is alkylene of up to 4 carbon atoms, $X_1$ is —NHCOC)—and m and p are each one.

The linking group L may be the bivalent residue of any difunctional moiety able to react with hydroxyl. Suitable precursors to L are α,ω-diepoxides, α,ω-diisocyanates, α,ω-diisothiocyanates, α,ω-diacylhalides, α,ω-dithioacylhalides, α,ω-dicarboxylic acids, α,ω-dithiocarboxylic acids, α,ω-dianhydrides, α,ω-dithioisocyanates, α,ω-dilactones, α,ω-dialkylesters, α,ω-dihalides, α,ω-dialkylethers, α,ω-dihydroxymethylamides. It is preferred that the linking group be a bivalent residue (—C(O)—NH—R—NH—C(O)—) of a diisocyanate or the corresponding residue of a dithioisocyanate, wherein R is a divalent organic radical having up to 20 carbon atoms.

The divalent radical R is, for example, alkylene, arylene, alkylenearylene, arylenealkylene or arylenealkylenearylene having up to 20 carbon atoms, a saturated bivalent cycloaliphatic, group having 6 to 20 carbon atoms or cycloalkylenealkylenecycloalkylene having 7 to 20 carbon atoms.

In a preferred embodiment, R is alkylene, arylene, alkylenearylene, arylenealkylene or arylenealkylenearylene having up to 14 carbon atoms or a saturated divalent cycloaliphatic group having 6 to 14 carbon atoms. In a particularly preferred embodiment, R is alkylene or arylene having up to 12 carbon atoms or a saturated bivalent cycloaliphatic group having 6 to 14 carbon atoms.

In a preferred embodiment, R is alkylene or arylene having up to 10 carbon atoms or a saturated bivalent cycloaliphatic group having 6 to 10 carbon atoms.

In a particularly preferred meaning, R is a radical derived from a diisocyanate, for example from hexane 1,6-diisocyanate, 2,2,4-trimethylhexane 1,6-diisocyanate, tetramethylene diisocyanate, phenylene 1,4-diisocyanate, toluene 2,4-diisocyanate, toluene 2,6-diisocyanate, m- or p-tetramethylxylene diisocyanate, isophorone diisocyanate or cyclohexane 1,4-diisocyanate.

Aryl is a carbocyclic aromatic radical which is unsubstituted or substituted preferably by( lower alkyl or lower alkoxy. Examples are phenyl, tolyl, xylyl, methoxyphenyl, t-butoxyphenyl, naphthyl and phenanthryl.

Arylene is preferably phenylene or naphthylene, which is unsubstituted or substituted by lower alkyl or lower alkoxy, in particular 1,3-phenylene, 1,4-phenylene or methyl-1,4-phenylene, 1,5-naphthylene or 1,8-naphthylene.

A saturated bivalent cycloaliphatic group is preferably cycloalkylene, for example cyclohexylene or cyclohexylene (lower alkylene), for example cyclohexylenemethylene, which is unsubstituted or substituted by one or more lower alkyl groups, for example methyl groups, for example trimethylcyclohexylenemethylene, for example the bivalent isophorone radical.

For the purposes of the present invention, the term "lower" in connection with radicals and compounds, unless defined otherwise, denotes, in particular, radicals or compounds having up to 8 carbon atoms, preferably having up to 4 carbon atoms.

Lower alkyl has, in particular, up to 8 carbon atoms, preferably up to 4 carbon atoms, and is, for example, methyl, ethyl, propyl, butyl, tert-butyl, pentyl, hexyl or isohexyl.

Alkylene has up to 12 carbon atoms and can be straight-chain or branched. Suitable examples are decylene, octylene, hexylene, pentylene, butylene, propylene, ethylene, methylene, 2-propylene, 2-butylene, 3-pentylene, and the like.

Lower alkylene is alkylene having up to 8 carbon atoms, particularly preferably up to 4 carbon atoms. Particularly preferred meanings of lower alkylene are propylene, ethylene and methylene.

The arylene unit in alkylenearylene or arylenealkylene is preferably phenylene, unsubstituted or substituted by lower alkyl or lower alkoxy, and the alkylene unit therein is preferably lower alkylene, such as methylene or ethylene, in particular methylene. These radicals are therefore preferably phenylenemethylene or methylenephenylene.

Lower alkoxy has, in particular, up to 8 carbon atoms, preferably up to 4 carbon atoms-, and is, for example, methoxy, ethoxy, propoxy, butoxy, tert-butoxy or hexyloxy.

Arylenealkylenearylene is preferably phenylene(lower alkylene)phenylene having up to 8, in particular up to 4, carbon atoms in the alkylene unit, for example phenylene-ethylenephenylene or phenylenemethylenephenylene.

Some examples of preferred diisocyanates from which bivalent residues L are derived include trimethylhexamethylenediisocyanate (TMHMDI), isophorone diisocyanate (IPDI), methylenediphenyl diisocyanate (MDI) and 1,6-hexamethylenediisocyanate (HMDI).

The blocks B may be monomeric, oligomeric or polymeric. The molecular weights and chemical composition of each block B may be the same or different, provided that they fall within the molecular weight range specified above. The blocks B may be hydrophobic or hydrophilic, provided that at least one of the blocks is of formula (PFPE). Other suitable blocks B may be derived from poly(alkylene oxides). When one or more of the blocks B is hydrophilic, these blocks are particularly preferably derived from poly(alkylene oxides), more preferably from poly(lower alkylene oxides), most preferred from the polyethylene glycols. It is most preferred that the B blocks are selected from blocks of formula (PFPE) and poly(alkylene oxides), provided that at least one of the blocks is of formula (PFPE). In two very preferred embodiments of the invention there are two B blocks in a macromonomer of formula 11 which are either both of formula (PFPE), or one of which is of formula (PFPE) while the other is derived from a poly(alkylene oxide), preferably from a poly(lower alkylene oxide), most preferred from polyethylene glycols. "Derived from a poly(alkylene oxide)" in the context of the definition of the B blocks means that such a B block differs from a poly(alkylene oxide) in that the two terminal hydrogens have been abstracted from such poly(alkylene oxide). In order to exemplify this, B denotes, if derived from a polyethylene glycol, —(OCH$_2$CH$_2$)$_a$O— wherein a is the index indicating the number or repeating ethyleneoxy groups.

The terminal group T is a univalent terminal group which is not polymerizable by free radicals but which may contain other functionality. Preferred terminal groups are hydrogen, alkyl, substituted alkyl, aryl or substituted aryl. More preferred groups T are hydrogen, lower alkyl and phenyl.

Suitable substituents for Q or T may be selected from: alkyl, alkenyl, alkynyl, aryl, halo, haloalkyl, haloalkenyl, haloalkynyl, haloaryl, hydroxy, alkoxy, alkenyloxy, aryloxy, haloalkoxy, haloalkenyloxy, haloaryloxy, amino, alkylamino, alkenylamino, alkynylamino, arylamino, acyl, aroyl, alkenylacyl, arylacyl, acylamino, alkylsulphonyloxy, arylsulphenyloxy, heterocyclyl, heterocycyloxy, heterocycylamino, haloheterocyclyl, alkoxycarbonyl, alkylthio, alkylsulphonyl, arylthio, arylsulphonyl, aminosulphonyl, dialkylamino and dialkylsulphonyl, having up to 10 carbon atoms.

The difunctional polymer from which M is derived contains an independently selected terminal functionality at each end which may react with the precursor of the linking group L so that a covalent linkage is formed. The preferred terminal functionality is hydroxyl or amino. Such functionality may be joined to the siloxane units in M by means of an alkylene group or other non reactive spacer. Preferred terminal moieties are hydroxyalkyl, hydroxyalkoxyalkyl and alkylamino. Especially preferred hydroxyalkyls are hydroxypropyl and hydroxybutyl; especially preferred hydroxyalkoxyalkyls are hydroxyethoxyethyl and hydroxyethoxypropyl. Preferred R$^1$ and R$^2$ groups are methyl.

Preferred M residues in formula III as specified above are of formula B

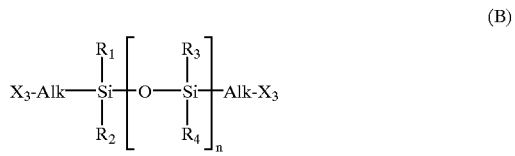

(B)

where n is an integer from 5 to 100; Alk is alkylene having up to 20 carbon atoms, uninterrupted or interrupted by oxygen; the radicals R$_1$, R$_2$, R$_3$ and R$_4$, independently of one another, are alkyl, aryl or halosubstituted alkyl; and X$_3$ is —O— or —NH—.

In a preferred meaning, n is an integer from 5 to 70, particularly preferably 8 to 50, in particular 10 to 28.

In a preferred meaning, the radicals R$_1$, R$_2$, R$_3$ and R$_4$ are, independently of one another, lower alkyl having up to 8 carbon atoms, particularly preferably lower alkyl having up to 4 carbon atoms, especially lower alkyl having up to 2 carbon atoms. A further particularly preferred embodiment of R$_1$, R$_2$, R$_3$ and R$_4$ is methyl.

Alkylene interrupted by oxygen is preferably lower alkylene-oxy-lower alkylene having up to 6 carbons in each of the two lower alkylene moieties, more preferably lower alkylene-oxy-lower alkylene having up to 4 carbons in each of the two lower alkylene moieties, examples being ethylene-oxy-ethylene or ethylene-oxy-propylene.

Halosubstituted alkyl is preferably lower alkyl substituted by one or more, especially up to three, halogens such as fluoro, chloro or bromo, examples being trifluoromethyl, chloromethyl, heptafluorobutyl or bromoethyl.

A preferred macromonomer is of formula I wherein n is in the range of from 2 to 5, L is a bivalent residue (—C(O)—NH—R—NH—C(O)—) of a diisocyanate wherein R is alkylene, arylene, alkylenearylene, arylenealkylene or arylenealkylenearylene having up to 14 carbon atoms or a saturated divalent cycloaliphatic group having 6 to 14 carbon atoms, and Q is a compound of formula A wherein P$_1$ is alkenyl of up to 4 carbon atoms, Y is —COO—, R' is alkylene of up to 4 carbon atoms, X$_1$ is —NHCOO— and m and p are each one.

A preferred macromonomer of formula I is one in which n is in the range of from 2 to 5, is the bivalent residue derived from trimethylhexamethylene diisocyanate (TMHMDI) and C) is the residue derived from isocyanatoethyl methacrylate.

A preferred embodiment of this invention is directed to a macromonomer of formula 1:

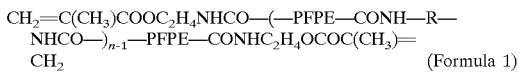
(Formula 1)

wherein PFPE is a perfluorinated polyether of formula (PFPE) as herein defined, wherein x is in the range of from 8 to 10 and y is in the range of from 10 to 14, n>1.0, and R is alkylene or arylene having up to 12 carbon atoms or a saturated bivalent cycloaliphatic group having 6 to 14 carbon atoms.

In a preferred embodiment of the present invention there is provided a macromonomer of formula 2:

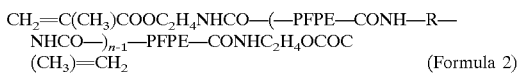
(Formula 2)

wherein PFPE is a perfluorinated polyether of formula (PFPE) as herein defined, n>1.0, R is the trimethylhexamethylene component of TMHMDI, and wherein x is in the range of from 8 to 10 and y is in the range of from 10 to 14.

In a preferred embodiment of the present invention there are provided macromonomers of formula 11 which correspond to formulae 3 to 6

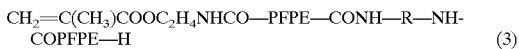 (3)

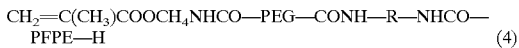 (4)

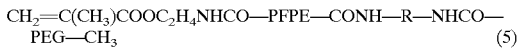 (5)

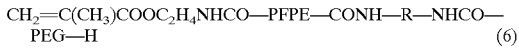 (6)

wherein PFPE is of formula (PFPE) wherein x and y are as defined hereinbefore, R is alkylene, arylene, alkylenearylene, arylenealkylene or arylenealkylenearylene having up to 14 carbon atoms or a saturated divalent cycloaliphatic group having 6 to 14 carbon atoms, and PEG is derived from polyethylene glycol. Preferably PEG has a molecular weight in the range of from 200 to 2000.

In an even more preferred embodiment of the present invention there are provided macromonomers of formulae 7 to 10

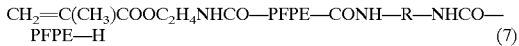 (7)

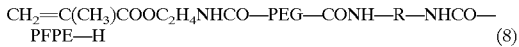 (8)

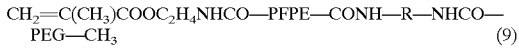 (9)

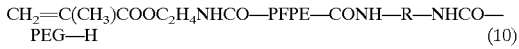 (10)

wherein PFPE is of formula (PFPE) wherein x and y are as defined hereinbefore, wherein R is the trimethylhexamethylene component of TMHMDI, and PEG is derived from polyethylene glycol. Preferably PEG has a molecular weight in the range of from 200 to 2000. It is also preferred in this embodiment that x is 10 and y is 12.

A preferred macromonomer of formula III is one in which the molecular weight of the perfluorinated polyether is in the range of from 800 to 4,000, L is the bivalent residue derived from trimethylhexamethylene diisocyanate (TMHMDI) and Q is the residue derived from isocyanatoethyl methacrylate. It is particularly preferred that the molecular weight of the perfluorinated polyether is about 2,000 and the molecular weight of M is about 1,000.

A preferred macromonomer of the present invention is of formula 11:

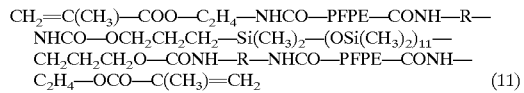 (11)

wherein PFPE is of formula (PFPE), and R is the trimethylhexamethylene component of TMHMDI (trimethylhexamethylene diisocyanate) and wherein x is 10 and y is 12.

In another aspect, this invention provides processes for the production of the claimed polymers. These processes enables these highly stable and resistant materials to be manufactured and utilized in porous form. Accordingly there is provided a process for the production of a porous polymer as defined herein comprising the steps of:

i) forming a mixture comprising a polymerizable component and an organic solvent wherein the polymerizable component comprises at least one macromonomer having at least one perfluoropolyether unit;

ii) polymerizing said mixture wherein immediately after the polymerization of said mixture at least a substantial proportion of said organic solvent is in the form of a discrete phase arid wherein said discrete organic solvent phase forms an interpenetrating network throughout the mixture or is dispersed throughout the mixture; and iii) removing the discrete organic solvent phase. This process is referred to hereinafter as method A.

Accordingly there is provided a second process for producing a porous polymer as defined herein comprising the steps of:

1) dispersing a porogen in a continuous monomer component phase wherein said continuous monomer component phase comprises at least one monomer having at least one perfluoropolyether unit and wherein said porogen is an optionally substituted poly(alkylene)glycol;

2) thereafter polymerising the continuous monomer phase; and 3) removing the porogen from the porous polymer. This process is referred to hereinafter as method B.

The further disclosure relating to the process of manufacture relates to both processes, method A and method B, if not specifically referred to otherwise.

The polymerizable component comprises at least one macromonomer having at least one perfluoropolyether unit. Other comonomers may be used to provide useful properties in the porous polymer such as crosslinking agents and other of the macromonomers described above. Suitable comonomers may also include comonomers comprising one or more ethylenically unsaturated groups which can enter into a reaction to form a copolymer. It is preferred that the ethylenically unsaturated group be selected from the group consisting of acryloyl, methacryloyl, styryl, acrylamido, acrylamidoalkyl, urethanemethacrylate, or any substituted derivatives thereof. Suitable comonomers include fluorine- and silicon-containing alkyl acrylates and hydrophilic comonomers, which may be selected from the wide range of materials available to a person skilled in the art, and mixtures thereof. Particularly preferred comonomers include dihydroperfluoroalkyl acrylates, such as dihydroperfluorooctyl acrylate and 1,1-dihydroperfluorobutyl acrylate, trihydroper-fluoroalkyl acrylates, tetrahydroperfluoroalkyl acrylates, tris(trimethylsilyoxy)propyl methacrylate or acrylate, and amine-containing comonomers, such as N,N-dimethylaminoethyl methacrylate, N,N-dimethyl acrylamide and N,N-dimethylaminoethyl-acrylamide. Other suitable comonomers may include a wide variety of macromonomers such as vinyl terminated polymethyl methacrylate oligomers and polydimethylsiloxanes terminated with ethylenically unsaturated groups. Where used it is preferred that the comonomers are present in the polymerization component in an amount of from 1 to 60% by weight of the polymerization component, most preferably 2 to 40%.

Copolymers may be formed from mixtures of macromonomers of formulae (I), (II), and (III with or without other comonomers. Other macromonomers (monofunctional or difunctional) may also be incorporated with or without further comonomers.

A crosslinking agent such as ethylene glycol dimethacrylate may optionally be added.

When the polymerizable component comprises ethylenically unsaturated monomers the polymerization may be initiated by ionizing radiation, photochemically or thermally using a free radical initiator. It is preferred to use a free radical initiator such as benzoin methyl ether, Darocur, azobisisobutyronitrile, benzoyl peroxide, peroxydicarbonates and the like. Particularly preferred photochemical free radical initiators are benzoin methyl ether and Darocur 1173 (registered trademark of Ciba-Geigy AG). Free radicals may be formed from the initiator by thermal or photochemical means; redox initiation may also be used.

It will be appreciated that the "organic solvent" may be a mixture and optionally may contain one or more of a surfactant, water, polar or non-polar materials.

In method A, the organic solvent is preferably a polar solvent and is preferably selected from the group consisting of short chain alcohols, amines, ethers, nitriles, carboxylic acids and ketones, and mixtures thereof. The said short chain alcohols, amines, ethers, nitriles, carboxylic acids or ketones may be cyclic, branched or linear; branched chain compounds are particularly preferred. The number of carbon atoms within the short chain compound may be from 1–12; it is preferred however that the number is from 2–8. Preferred organic solvents are amines having up to 12 carbon atoms, alcohols of up to 12 carbon atoms, preferably non-fluorinated alcohols, ethers of up to 12 carbon atoms, nitrites of up to 12 carbon atoms, carboxylic acids of up to 12 carbon atoms and ketones of up to 12 carbon atoms. More preferred organic solvents are non-fluorinated $C_1$–$C_{10}$-alkanols, such as methanol, ethanol, isopropyl alcohol, 3-methyl-2-butanol, cyclohexanol or cyclopentanol, $C_1$–$C_{10}$-amines, such as 3-hexylamine and isopropylamine, $C_1$–$C_{10}$-ethers, such as diisopropyl ether, $C_1$–$C_{10}$-nitriles, such as acetonitrile, $C_1$–$C_{10}$-carboxylic acids, such as acetic acid, and $C_1$–$C_{10}$-ketones, such as cyclohexanone or p-flurorobenzene methyl ketone, and even more preferred are such solvents having up to 7 carbon atoms. Further preferred are non-fluorinated $C_1$–$C_{10}$-alkanols, $C_1$–$C_{10}$-amines, diisopropyl ether, $C_1$–$C_{10}$-nitriles, $C_1$–$C_{10}$-carboxylic acids, and $C_1$–$C_{10}$-ketones, and even more preferred are such solvents having up to 7 carbon atoms. Especially preferred as organic solvents are alcohols, including the above preferences.

It is also possible to use as an organic solvent a non-polar solvent, but preferably a polar solvent as specified hereinbefore in mixture with a small amount of a non-polar solvent. Such non-polar solvent may be a hydrocarbon solvent having up to 12 carbon atoms which may be cyclic, branched or linear, and which may be substituted by lower alkyl, lower alkoxy or halogen, such as methyl, ethyl, methoxy, fluoro or chloro. Preferred such non-polar solvents are said hydrocarbon solvents having up to 8 carbon atoms, such as cyclohexane or p-fluoromethoxy benzene. The amount of these non-polar solvents, if not used alone, is preferably up to 25% of the total solvent used, more preferred up to 10% of the total solvent used.

Isopropyl alcohol, diisopropyl ether, 3-hexanol, cyclopentanol, 3-hexylamine and isopropylamine are particularly preferred organic solvents.

In method B, porogens for use in the present invention may be selected from the range of optionally substituted (i.e. unsubstituted or substituted) poly(alkylene)glycols, preferably those having up to 7 carbon atoms in each alkylene unit which may be the same or different. Unsubstituted poly (alkylene)glycols are preferred. Preferably the porogen is one or more poly(lower alkylene)glycol, wherein lower alkylene in this context denotes alkylene of up to 6 carbon atoms, preferably up to 4 carbon atoms, in each alkylene unit. We have found polypropylene glycols particularly preferred porogens in the process of the present invention. The porogens may be of varying molecular weight and are preferably less than 4000 in molecular weight, even more preferred less than 1000 in molecular weight. We have found it preferable for the porogen to be liquid at room temperature. Substituted poly(alkylene)glycols are understood to include poly(alkylene)glycols wherein one or two hydroxy groups have been replaced by an ether group, e.g. a lower alkoxy group, or an ester group, e.g. a lower alkylcarbonyloxy group, such that a substituted poly(alkylene)glycol may be preferably represented by a mono-poly(alkylene)glycol-ether, a di-poly(alkylene)glycol-ether, a mono-(poly) alkylene)glycol-ester, a di-poly(alkylene)glycol ester, or a poly(alkylene)glycol-monoether-monoester.

While polypropyleneglycol is particularly preferred, other polyalkylene glycols such as polyethylene glycols may also be used.

The polymerizable component may be mixed with the organic solvent, or the porogen, respectively, and other optional components by any convenient means. For example the polymerizable component may be mixed with the organic solvent, or the porogen, respectively, and other optional components by shaking or stirring. The order in which the components are added to the mixture is not narrowly critical. The various components which make up the polymerizable component do not need to be combined prior to incorporation in the mixture. The mixture may be in the form of an homogeneous solution or may have the organic solvent or the porogen, respectively, as a distinct phase, such as in the form of a dispersion, microemulsion or preferably a co-continuous microemulsion. In method A, the form of the mixture prior to polymerization is not narrowly critical since it is the form of the mixture during polymerization which controls the morphology of the porous polymer.

The mixture may be in the form of a microemulsion. Microemulsions are thermodynamically stable and essentially transparent two phase systems which are usually stabilised by an interfacial layer of surface-active agents. Microemulsions typically consist of uniform and spherical droplets dispersed in a continuous medium. The particle size is typically of the order of $10^{-2}$ microns. Microemulsions may also exist in a co-continuous structure wherein each phase exists as a continuous interpenetrating network within the other phase.

In method A, minor amounts of property modifying components may optionally be added to the mixture before polymerization. For example, other solvents may be added.

Suitable other solvents include ethyl acetate, dimethyl formamide, water and fluorinated alcohols. In most cases such solvents are added to reduce viscosity of the solution or to make the solution easier to dispense, for example into molds.

In method B, minor amounts of property modifying components may optionally be added to the mixture before polymerization. For example, solvents may be added. Suitable solvents include short chain alcohols, amines or ethers, as well as ethyl acetate, dimethyl formamide, water and fluorinated alcohols. In most cases such solvents are added to reduce viscosity of the solution or to make the solution easier to dispense, for example into molds. The short chain alcohols, amines or ethers may be cyclic, branched or linear; branched chain compounds are particularly preferred. The number of carbon atoms within the short chain compound may be from 1–12; it is preferred however that the number is from 2–8. Isopropyl alcohol, diisopropyl ether, 3-hexanol, cyclopentanol, 3-hexylamine and isopropylamine are particularly preferred.

Surfactants, preferably fluorinated surfactants, may be incorporated into the mixture. The use of surfactants is an effective means of controlling the size and density of the pores. Non-ionic surfactants containing fluorine are preferred. Particularly preferred surfactants include commercially available fluorinated surfactants such as Zonyl (DuPont) and Fluorad (3M). Zonyl FS300 (DuPont), which is made of a perfluorinated hydrophobic tail and hydrophilic poly(ethylene oxide) head group, is a particularly preferred surfactant for use in the process of the present invention.

Another type of compound which may act as a surfactant in the context of this invention are macromonomers of formula 11 as disclosed herein. These compounds are disclosed in more detail in International patent application No. PCT/EP96/01256, the relevant disclosure of which, including the preferences thereof, is incorporated herein.

The mixture may be polymerised by any convenient method generally as described above with reference to the initiation of the polymerizable component. Suitable polymerization conditions will be apparent to those skilled in the art. For example, temperatures may range from –100 to 350° C. and pressures may range from below atmospheric to above atmospheric.

In method A, immediately after polymerization it is essential that a substantial proportion of the organic solvent is in the form of a discrete phase. The discrete organic solvent phase may be in the form of an interpenetrating network throughout the polymerized component or may be dispersed as droplets throughout the polymerized component.

Still in method A, it will be understood that by "a substantial proportion of the organic solvent is in the form of a discrete phase" we mean that there is sufficient organic solvent phase to form either an interpenetrating network of organic solvent phase or a dispersion of organic solvent phase. It will be understood by the person skilled in the art that depending on the polymerization component and the organic solvent a proportion of organic solvent may be adsorbed or retained in the polymerization component and eventually in the porous polymer. Typically more than 60% of the organic solvent is in the form of a discrete phase immediately after polymerization. It is preferred that greater than 80% of the organic solvent is in the form of a discrete phase, more preferably greater than 95% of the organic solvent is in the form of a discrete phase.

In method B, it will be understood that by "a substantial proportion of the porogen remains in the form of a discrete phase" we mean that there is sufficient porogen to form either an interpenetrating network or a dispersion. It will be understood by the person skilled in the art that depending on the polymerization component and the porogen a proportion of porogen may be adsorbed or retained in the polymerization component and eventually in the porous polymer. Typically more than 60% of the porogen is in the form of a discrete phase immediately after polymerization. It is preferred that greater than 80% of the porogen is in the form of a discrete phase, more preferably greater than 95% of the porogen is in the form of a discrete phase.

It is particularly preferred that the organic solvent phase, or the porogen, respectively, forms an interpenetrating network in the polymerization component resulting in the porous polymer having a reticulated porous morphology. The reticulated porous morphology may be an open-cell, sponge-like structure consisting of interconnected polymer globular particles or may have an open-cell structure with an array of interconnected generally spherical pores.

In another preferred embodiment the porous polymer may be in the form of a closed-cell structure with discrete pores dispersed throughout the polymer.

The organic solvent, or the porogen, respectively, may be removed from the porous polymer by any convenient means. Suitable means for removal of solvent, or the porogen, respectively, include evaporation, solvent extraction, washing or leaching.

The process of the present invention is useful for generating materials of various pore sizes and morphologies. The upper limit of average pore size of individual pores is about 5 microns, with 100 manometers being typical, while pores of around 10 manometers in diameter may also be obtained.

The pores may form an interpenetrating network. It is more useful to characterise these morphologies in terms of permeability to molecules of defined molecular weight. A typical procecure for handling the porous polymers, once polymerized, and for characterization cf morphology in terms of permeability to molecules is described before the examples section.

The morphology and porosity of the porous polymer may be controlled by altering the ratio of the organic solvent, or the porogen, respectively, to the monomer. At high ratios of organic solvent, or the porogen, respectively, an open sponge-like structure consisting of interconnected polymer globular particles is obtained. At lower ratios, a reticular network of pores is obtained. At even lower ratios a closed-cell morphology is obtained.

In method A, we have found that ratios of polymerizable component to solvent of about 1:1.3 result in the porous polymer having an open sponge-like structure consisting of interconnected polymer globular particles. At ratios of about 1:0.5 the porous polymer generally has a reticular network of pores. At ratios of about 1:0.1 the porous polymer generally has a closed-cell morphology.

Particularly useful embodiments of the present method have the organic solvent phase, or the porogen phase, respectively, in the form of a continuous interpenetrating network structure which may be readily extracted to leave a porous PFPE material having a reticular network of pores allowing ready passage of fluid and small diameter particles through the porous polymer.

The size and density of the pores may be controlled by the ratio of the polymerizable component to organic solvent. Minor changes can be effected by the use of surfactants as hereinabove described. The addition of a minor proportion of water also increases porosity.

As stated to some extent hereinbefore, comonomers comprising one or more ethylenically unsaturated groups which can enter into a reaction to form a copolymer may be incorporated. It is preferred that the ethylenically unsaturated group be selected from the group consisting of acryloyl, methacryloyl, styryl, acrylamido, acrylamidoalkyl, or urethanemethacrylate, or any substituted derivatives thereof.

A comonomer present in the novel polymer can be hydrophilic or hydrophobic or a mixture. thereof. Suitable comonomers are, in particular, those which are usually used in the production of contact lenses and biomedical materials. A hydrophobic comonomer is taken to mean a monomer which typically gives a homopolymer which is insoluble in water and can absorb less than 10% by weight of water. Analogously, a hydrophilic comonomer is taken to mean a monomer which typically gives a homopolymer which is soluble in water or can absorb at least 10% by weight of water.

Suitable hydrophobic comonomers are, without limitation thereto, $C_1$–$C_{18}$alkyl and $C_3$–$C_{18}$cycloalkyl acrylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$alkenes, $C_2$–$C_{18}$haloalkenes, styrene, (lower alkyl)styrene, lower alkyl vinyl ethers, $C_2$–$C_{10}$perfluoroalkyl acrylates and methacrylates and correspondingly partially fluorinated acrylates and methacrylates, $C_3$–$C_{12}$perfluoroalkylethylthiocarbonylaminoethyl acrylates and methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like.

Preference is given, for example, to acrylonitrile, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic comonomers are methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tristrimethylsilyloxysilyl. propyl methacrylate (hereinafter: Tris methacrylate), tristrimethylsilyloxysilylpropyl acrylate (hereinafter: Tris acrylate), 3-methacryloxy propylpentamethyiidisiloxane and bis(methacryloxypropyl) tetramethyidisiloxane.

Preferred examples of hydrophobic comonomers are methyl methacrylate, Tris acrylate, Tris methacrylate and acrylonitrile.

Suitable hydrophilic comonomers are, without this being an exhaustive list, hydroxyl-substituted lower alkyl acrylates and methacrylates, acrylamide, methacrylamide, (lower alkyl). acrylamides and -methacrylamides, ethoxylated acrylates and methacrylates, hydroxyl-substituted (lower alkyl) acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)— (where the term "amino" also includes quaternary ammonium), mono(lower alkylamino) (lower alkyl) and di(lower alkylamino) (lower alkyl) acrylates and methacrylates, allyl alcohol and the like. Preference is given, for example, to N-vinyl-2-pyrrolidone, acrylamide, methacrylamide, hydroxyl-substituted lower alkyl acrylates and methacrylates, hydroxy-substituted (lower alkyl) acrylamides and -methacrylamides and vinylically unsaturated carboxylic acids having a total of 3 to 5 carbon atoms.

Examples of suitable hydrophilic comonomers are hydroxyethyl methacrylate (HEMA), hydroxyethyl acrylate, hydroxypropyl acrylate, trimethylammonium 2-hydroxy propylmethacrylate hydrochloride (Blemer® OA, for example from Nippon Oil), dimethylaminoethyl methacrylate (DMAEMA), dimethylaminoethyl (meth)acrylamide, acrylamide, methacrylamide, N,N-dimethylacrylamide (DMA), allyl alcohol, vinylpyridine, glycerol methacrylate, N-(1,1-dimethyl-3-oxobutyl)acrylamide, N-vinyl-2-pyrrolidone (NVP), acrylic acid, methacrylic acid and the like.

Preferred hydrophilic comonomers are trimethylammonium 2-hydroxy propylmethacrylate hydrochloride, 2-hydroxyethyl methacrylate, dimethylaminoethyl methacrylate, trimethylammonium 2-hydroxypropylmethacrylate hydrochloride, N,N-dimethylacrylamide and N-vinyl-2-pyrrolidone.

As stated hereinbefore, suitable comonomers include fluorine- and silicon-containing alkyl acrylates and hydrophilic comonomers, which may be selected from a wide range of materials available, and mixtures thereof. Particularly preferred comonomers include dihydroperfluoroalkyl acrylates, such as dihydroperfluorooctyl acrylate and 1,1-dihydroperfluorobutyl acrylate, trihydroperfluoroalkyl acrylates, tetrahydroperfluoroalkyl acrylates, tris (trimethylsilyloxy)propyl methacrylate or acrylate, and amine-containing comonomers, such as N,N-dimethylaminoethyl methacrylate, N,N-dimethylacrylamide and N,N-dimethyl-aminoethyl-acrylamide. The preferred range for addition of individual comonomers into the formulation is from 0 to 60% by weight and most preferably 0 to 40% by weight of the formulation. Mixtures of macromonomers of formula I, II or III may also be used to make suitable copolymers with or without other comonomers.

A polymer network can, if desired, be reinforced by addition of a crosslinking agent, for example a polyunsaturated crosslinking comonomer. In this case, the term crosslinked polymers is used. The invention, therefore, furthermore relates to a crosslinked polymer comprising the product of the polymerization of a macromer of the formula (I), (II), or (III), if desired with at least one vinylic comonomer and with at least one crosslinking comonomer.

Examples of typical crosslinking comonomers are allyl (meth)acrylate, lower alkylene glycol di(meth)acrylate, poly (lower alkylene) glycol di(meth)acrylate, lower alkylene di(meth)acrylate, divinyl ether, divinyl sulfone, di- and trivinylbenzene, trimethylolpropane tri(meth)acrylate, pentaerythritol tetra(meth)acrylate, bisphenol A di(meth) acrylate, methylenebis(meth)acrylamide, triallyl phthalate and diallyl phthalate.

If a crosslinking comonomer is used, the amount used is in the range of from 0.05 to 20% of the expected total weight of polymer, preferably the comonomer is in the range of 0.1 to 10%, and more preferably in the range of 0.1 to 2%.

According to a further aspect of the present invention there is provided an ophthalmic device, preferably a contact lens, and even more preferred a soft contact lens manufactured from the porous polymers or copolymers as hereinbefore described.

Contact lenses, and also soft contact lenses, are polymer disks with surfaces of differing radii of curvature. The radii are selected in combination with the refractive index of the polymer so that the desired optical correction is obtained and the inner surface of the lens matches the contour of wearer's cornea. They are normally sold in sterile saline. Optionally the surface of the lens may be modified by coating using procedures well known to the art, such as plasma polymerisation, glow discharge or grafting of a more hydrophilic polymer.

By way of example, in the manufacture of such lenses the appropriate quantities of polymerizable monomers, solvent (if required) and photoinitiator are mixed together to form a polymerization mixture. The polymerization mixture is then flushed with nitrogen and the required quantity dispensed into the concave half of a polypropylene mould. The mould is closed and clamped and the assembly is placed into a UV irradiation cabinet equipped with UV lamps. The irradiation is performed for the required time and then the halves of the mould are separated. The polymerized lens is extracted in an appropriate solvent (for example, an isopropyl or tert-butylacetate/fluorinated solvent mixture). The solvent is then extensively exchanged with an alcohol (for example, isopropyl alcohol) and subsequently with saline to yield the product lens.

The polymers produced according to the present invention may be formed into other useful articles by in situ polymerization or further processed using techniques well known in the art. Given the visual transparency of the polymers of the present invention, they may find use in tissue culture apparatus, optical instruments, microscope slides and the like.

A further aspect of this invention is the use of the porous perfluoropolyether in film or sheet form as a membrane or a filter. Such porous PFPE film may be laminated with another support film to form a composite. Such poly PFPE film may be of symmetrical or unsymmetrical pore structure. Such applications may involve permeability to gases or liquids.

The porous polymers of the present invention may be suitable, for example, for use in the fields of membrane filters and separation, in the field of industrial biotechnology, and in the biomedical field.

Examples for the field of membrane filters and separation are industrial membranes, e.g. for micro filtration and ultra filtration, for example in the food, dairy, juice, or low alcohol beer industries, waste water treatment, home reverse osmosis, or membrane distillation using osmotic pressure.

Examples for the field of industrial biotechnology are supports for synthetic and biological ligands or receptors for bioreactors and biosensors, sustained release devices for active compounds, or capacitors.

Examples for the biomedical field are ophthalmic devices, e.g. contact lenses or artificial cornea, dialysis and blood filtration, encapsulated biological implants, e.g. pancreatic islets, implanted glucose monitors, drug delivery patches and devices, wound healing and dressing, artificial skin, vascular grafts, regenerative templates or patches for wound healing, (soft) tissue augmentation, percutaneous fixation devices or artificial organs.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

The present invention is further described in the following non-limiting examples. If not otherwise specified, all parts are by weight. Temperatures are in degrees Celsius. Molecular weights of macromers or polymers are number average molecular weights if not otherwise( specified.

In the examples in this specification Macromonomer (1) is a vinyl terminated perfluorinated macromer of the formula

wherein PFPE is the perfluorinated polyether component of 3M Experimental Product L-12875 being a mixture of perfluorinated polyethers of formula:

wherein the $CF_2CF_2O$ and $CF_2O$ units may be randomly distributed or distributed as blocks throughout the chain and wherein x is in the range of from 8 to 10 and y is in the range of from 10 to 14.

In example 25 Macromonomer (2) is a vinyl terminated perfluorinated macromer of the formula

wherein PFPE is defined as for Macromonomer (1) above, and R is the trimethylhexamethylene component of TMH-MDI.

The following methods are used:

Water content measurement: The % water content (w/w) of the porous polymers was determined by comparing the hydrated and dehydrated weight of the polymers. The polymers were first dried overnight in a vacuum oven (0.1 mmHg) at 37° C. then weighed or cooling. Hydration was achieved via a graded solvent exchange process The dry polymer disks are soaked in the following solutions in turn, spending ½ an hour in each solution before the solvent is changed for the next. For every 10 polymer disks 60 ml of solvent was used.

1. 100% Ethanol
2. 75% Ethanol/water
3. 50% Ethanol/water
4. 25% Ethanol/water
5. 100% Water The polymers are allowed to equilibrate overnight in water or until constant weight—equilibration times for hydrophilic polymers may be longer than 16 h. The hydrated polymers are placed on fine grade lint free Kimwipes paper (Kimberly-Clark) to pat dry the excess surface moisture and finally weighed as the hydrated weight.

$$\% \text{ Water content} = \frac{\text{hydrated weight} - \text{dry weight}}{\text{hydrated weight}} \times 100$$

Permeability Measurement
Method A: Monitoring permeability by UV spectroscopy
Permeant: Bovine Serum Albumin (BSA, Molecular weight=67,000).
Concentration of BSA=8 mg/ml in Phosphate buffered saline (PBS),
PBS=20 mM Phosphate in 0.2M sodium chloride, pH=7.4.

The porosity of the synthetic polymers was investigated using a static diffusion cell (ie. solutions are not stirred). This method involves fixing one hydrated flat 20 mm diameter polymer disk (see water content measurements for hydration procedure) between two chambers which are separated by a rubber 'O' ring with a internal diameter of 7.5 cm. Each chamber holds a volume of approximately 2.2 ml.

One chamber contains an 8 mg/ml solution of BSA in PBS while the other chamber is filled with only PBS. At selected time intervals samples were removed from the PBS chamber using a glass pipette and the UV. absorbance of the solution measured at 280 nm ($A_{280}$). This determines whether any BSA had diffused through the polymer disk. A higher absorbance reading points to a higher rate of BSA diffusion and is therefore indicative of a structure with a relatively large pore size and/or a larger pore density.

Method B

A more quantitative measurement of BSA permeability was established using a device in which the flat 20 mm diameter sample was fixed between two chambers in which the BSA/PBS and PBS solutions were being stirred at rates of greater than 200 rpm. The purpose of stirring was to overcome the mass transfer resistance which predominantly exists at the surface boundary layer of a porous material. This method was used to measure the permeability of the polymer disks to glucose, Inulin and $I_{125}$ labelled BSA. The permeability is measured relative to commercial track etched polycarbonate membranes (Trade name of Poretics) with pore sizes of 50 nm and 25 nm.

EXAMPLE 1

The following formulations were placed in polypropylene moulds and polymerised for 3 hours under the irradiation from 365 nm U.V. lamps. All parts are by weight.

|  | A (parts) | B (parts) |
| --- | --- | --- |
| Macromonomer (1) | 1.41 | 1.40 |
| Iso-propanol | 1.23 | 0.70 |
| Zonyl FS-300 | 0.06 | 0.006 |
| Darocur | 0.008 | 0.008 |

The polymers are removed from the mold and placed through a general extraction and drying procedure to remove any unpolymerised components. This procedure consisted of a 4 h soaking in a fluorinated solvent (PF5060 from 3M Corporation), then 16 hr immersion in isopropyl acetate and subsequent immersion for 4 h in isopropyl alcohol. After drying in vacuo the polymer takes on a white colour. When the white polymers undergo a graded solvent change from ethanol, 75% ethanol/water, 50% ethanol/water, 25% ethanol/water then pure water or saline, they become transparent. The graded solvent change has the effect of introducing water into the porous channels of the porous PFPE materials; this occurs despite the very hydrophobic nature of PFPE based materials. The water content of the thus "hydrated" polymers was measured to be 46% and 36% (w/w) respectively for examples 1 A and B.

Using flat 20 mm diameter disks cast from 0.2 mm thick moulds, the permeability of the polymer films to iodine 125 ($I^{125}$) labelled albumin was measured using the stirred solution chamber technique. The $I^{125}$ albumin permeability of the membranes from Examples 1 A and 1 B was determined to be $1.36 \times 10^{-5}$ and $8.60 \times 10^{-6}$ cm/sec respectively.

A comparison of Examples 1 A and 1 B shows that reducing the amount of isopropanol in the polymerisation mixture not only reduces the exchanged water content of the polymer films but also causes a reduction in 1125 albumin permeability. This points to Example 1 B having a morphology of smaller pores and/or lower pore density.

EXAMPLE 2

The following formulations were placed in polypropylene moulds and polymerised for 3 hours under the irradiation from 365 nm U.V. lamps. All parts are by weight.

|  | A (parts) | B (parts) |
| --- | --- | --- |
| Macromonomer (1) | 1.00 | 1.00 |
| Iso-propanol | 1.30 | 1.00 |
| Zonyl FS-300 | — | 0.30 |
| Darocur | 0.006 | 0.005 |

On performing a graded solvent exchange from ethanol to water, an identical water content of 53% (w/w) was measured for Examples 2A and 2B. Using flat 20 mm diameter polymer disks cast from 0.2 mm thick moulds, the permeability of the polymer disks was compared by monitoring the diffusion of BSA using U.V. spectroscopy (see Example 1). After 1.5 hours, the absorbance readings of the initially protein free PBS solutions were $A_{280}$=0.19 and 0.083 for the formulations 2A and 2B respectively. Therefore, introduction of the surfactant Zonyl FS 300 into the polymerisation mixture (formulation 2B) cause a substantial decrease in albumin permeability. An examination of the SEM images produced from Examples 2A and 2B shows that the material without surfactant has a more open, porous structure.

EXAMPLE 3

The following formulations were placed in polypropylene moulds (0.2 mm thick, 20 mm diameter) and polymerised for 3 hours under the irradiation from 365 nm U.V. lamps. All parts are by weight.

|  | A (parts) | B (parts) |
| --- | --- | --- |
| Macromonomer (1) | 0.51 | 0.31 |
| Methanol | 0.50 | — |
| 3-Methyl-2-butanol | — | 0.31 |
| Darocur | 0.003 | 0.004 |

The permeability of the polymer disks to a solution of BSA was monitored by the U.V. spectroscopic technique. After 25 hours the absorbance reading for polymer A was $A_{280}$=0.87 while that measured for polymer B was $A_{280}$=0.83 (27 hours) showing that porous perfluoropolyethers could be generated by polymerisation in the presence of short chain alcohols. After hydration the water content of polymers A and B was measured to be 34.0 and 48.8% (w/w) respectively.

EXAMPLE 4

The following formulations were placed in polypropylene moulds (0.2 mm thick, 20 mm diameter) and polymerised for 3 hours under the irradiation from 365 nm U.V. lamps. All parts are by weight.

|  | A (parts) | B (parts) |
| --- | --- | --- |
| Macromonomer (1) | 0.60 | 0.53 |
| 3-Hexanol | 0.30 | — |
| Ethanol | — | 0.31 |
| Fluorad (3M) | 0.05 | — |
| Darocur | 0.004 | 0.004 |

The permeability of the polymer films to a solution of BSA was monitored by the U.V. spectroscopic technique. After 25 hours the absorbance reading for polymer A was $A_{280}$=0.38 while that measured for polymer B was $A_{280}$=0.62 (27 hours) showing that the polymer was porous. After hydration the water content of lens B was measured to be 35.1% (w/w).

EXAMPLE 5

The following formulations were placed in flat polypropylene moulds (0.2 mm thick, 20 mm diameter) and polymerised for 3 hours under the irradiation from 365 nm U.(. lamps. All parts are by weight.

|  | A (parts) | B (parts) |
| --- | --- | --- |
| Macromonomer (1) | 0.41 | 0.40 |
| Water | 0.21 | 0.12 |
| Fluorad (3M) | 0.09 | 0.06 |
| Isopropanol | 0.60 | 0.40 |
| Ethylene glycol dimethacrylate | 0.04 | — |
| Darocur | 0.009 | 0.008 |

The permeability of the polymer films to a solution of BSA was monitored by the U.V. spectroscopic technique. After 47 hours the absorbance reading for polymer A was $A_{280}$=1.11 while that measured for polymer B was $A_{280}$= 1.29. After hydration the water content of polymers A and B was measured to be 63.6 and 56.2% (w/w) respectively, demonstrating that the presence of water in the mixture increases the pore volume.

EXAMPLE 6

The following formulations were placed in flat polypropylene moulds (0.2 mm thick, 20 mm diameter) and polymerised for 3 hours under the irradiation from 365 nm U.V. lamps. All parts are by weight.

|  | A (parts) |
| --- | --- |
| Macromonomer (1) | 0.55 |
| Diisopropyl ether | 0.51 |
| Darocur | 0.005 |

The permeability of the polymer films to a solution of BSA was monitored by the U.V. spectroscopic technique. After hydration the water content of polymer A was measured to be 35.1% (w/w).

A Scanning electron micrograph (SEM) of lens A showed the structure was made up of fused, loosely interconnected latex particles of approximately 350 nm in diameter with the porous channels distributed around them.

EXAMPLE 7

The following formulation was placed in a polypropylene lens moulds and polymerised for 3 hours over the irradiation generated from a U.V. lamp at a wavelength of 365 nm. All parts are by weight.

| Macromonomer (1) | 1.61 Parts |
| --- | --- |
| PPG-725 | 0.26 Parts |
| Darocur | 0.008 parts |

PPG-725 is poly(propylene glycol) of molecular weight 725. The permeability of the lenses to a solution of BSA was monitored by the U.V. spectroscopic technique (see example 1). After 21 hours the absorbance reading of the initially protein free PBS solution was $A_{280}$=0.066, this increased to $A_{280}$=0.117 after 44 hours.

EXAMPLE 8

The following formulations were placed in polypropylene lens moulds (0.2 mm thick, 20 mm diameter) and polymerised for 3 hours over the irradiation generated from a U.V. lamp at a wavelength of 365 nm. All parts are by weight.

|  | A (parts) |
| --- | --- |
| Macromonomer (1) | 0.045 |
| Poly(propylene glycol) (Mw = 192) | 0.28 |
| Isopropanol | 0.10 |
| Darocur | 0.007 |

The permeability of the lenses to a solution of BSA was monitored by the U.V. spectroscopic technique. After 24 hours the absorbance reading for lens A was $A_{280}$=0.28. After hydration the water content of lens A was measured to be 31.8% (w/w).

The preparation of porous polymers from formulation A was equally as successful when the isopropanol was replaced with other common organic solvents such as ethanol, ethylacetate and dimethylformamide.

EXAMPLE 9

Preparation of microporous polymer discs:

The porous polymer discs were synthesised by the ultraviolet (UV) radical initiated polymerization of the thermodynamically stable, transparent, homogenous mixtures containing a macromonomer of formula I (n=1) and isopropanol. Macromonomer of formula I (n=1) was obtained from Minnesota Mining and Manufacturing Company, St. Paul, MN., USA as experimental product L-9629. (L-9629 is a perfluoropolyether which is end capped with two polymerizable methacrylate functionalities and has an approximate molecular weight of 2000). The following composition is used in the manufacture of these discs:

|  | Parts by weight |
| --- | --- |
| Macromonomer of Formula I (n = 1) | 54 |
| Isopropanol | 43 |
| Zonyl FS-300 (Du Pont) | 2.25 |
| Darocur 1173 (Ciba-Geigy) | 0.15 |

The macromonomer, solvent and surfactant were added to a glass screw capped vial furnished with a PTFE coated magnetic stirrer bar. The glass vial was then placed on a magnetic stirrer plate for ten minutes to allow thorough mixing of the three components. The free radical initiator Darocur 1173 then was added and mixing continued for a further five minutes. The resulting mixture was then placed under nitrogen into polypropylene flat moulds (0.2 mm thick) and polymerized for 3 h under irradiation from 365 nm UV lamps.

After polymerization was complete, the resulting flat polymeric discs were demoulded and extracted in isopropanol overnight (using 60 ml of solvent for every 10 discs). The solvent was then decanted off and replaced by isopropyl acetate. After standing at 37° C. for 4 hours, this solvent was then replaced by PF5060. After a further four hours at 37° C. the PF5060 was decanted and the discs were allowed to stand at room temperature until the excess PF5060 evaporated. The discs were finally stored in ethanol.

By this procedure, the polymer was obtained in microporous form as flat disks. The "hydrated" water content (% w/w) of the resulting porous discs was determined to be 52%. The permeabilities of the discs to glucose (Molecular Weight=181), inulin (Molecular Weight=5,500)

and albumin (Molecular Weight=67,000) were determined to be:

|  | Permeability cm/s |
|---|---|
| Glucose | $2.1 \times 10^{-4}$ |
| Inulin | $8.3 \times 10^{-5}$ |
| Albumin | $1.4 \times 10^{-5}$ |

The permeability of the perfluorinated discs were measured with reference to the permeabilities of glucose, inulin and albumin through Nuclepore 50 nm and Poretics 25 nm pore diameter discs, the porosities of which PCT/EP94/03680 teaches is suitable for an artificial corneal onlay.

|  | Permeability cm/s | | |
|---|---|---|---|
|  | Glucose | Inulin | Albumin |
| Nuclepore 50 nm | $4.7 \times 10^{-4}$ | $1.7 \times 10^{-4}$ | $2.2 \times 10^{-5}$ |
| Poretics 25 nm | $4.6 \times 10^{-5}$ | $1.1 \times 10^{-5}$ | $0.6 \times 10^{-6}$ |

This shows that the polymer of this example has a porosity intermediate between the Nuleopore and Poretics membrane and thus is of suitable porosity to provide an adequate flux of nutrients and high molecular weight proteins for a corneal onlay.

EXAMPLE 10

The polymer of Example 9 was obtained in an alternative microporous disk form. The following mixture was placed in 7×10 polypropylene membrane molds and polymerized for three hours over broad spectrum UV lamps using an identical protocol to that in Example 9.

|  | Parts by weight |
|---|---|
| Macromonomer of Formula I (n = 1) | 70 |
| Isopropanol | 35 |
| Darocur 1173 (Ciba-Geigy) | 0.19 |

The water content was determined to be 33%. The permeability was as follows:

|  | Permeability cm/s |
|---|---|
| Glucose | $9.18 \times 10^{-5}$ |
| Inulin | $3.21 \times 10^{-5}$ |
| Albumin | $0.86 \times 10^{-5}$ |

The porous polymer was examined for bovine corneal epithelial and fibroblast attachment The results indicate that this polymer supports the attachment and growth of corneal epithelial cells and corneal stromal fibroblasts.

EXAMPLE 11

The polymer of Example 9 was obtained in an alternative microporous disc form. The following mixture was placed in 7×10 polypropylene membrane molds and polymerized for three hours over broad spectrum UV lamps using an identical protocol to that in Example 9.

|  | Parts by weight |
|---|---|
| Macromonomer of Formula I (n = 1) | 40 |
| Isopropanol | 40 |
| Zonyl FS-300 (Du Pont) | 12 |
| Darocur 1173 (Ciba-Geigy) | 0.31 |

The water content was determined to be 52%. The permeability was:

|  | Permeability cm/s |
|---|---|
| Glucose | $1.2 \times 10^{-4}$ |
| Inulin | $4.5 \times 10^{-5}$ |
| Albumin | $0.8 \times 10^{-5}$ |

EXAMPLE 12

A further microporous form of the polymer of Example 9 was obtained by polymerizing the following mixture by the method of Example 9.

|  | Parts by weight |
|---|---|
| Macromonomer of Formula I (n = 1) | 85 |
| Isopropanol | 25 |
| Darocur 1173 (Ciba-Geigy) | 0.30 |

The water content was determined to be 15%. The permeability was:

|  | Permeability cm/s |
|---|---|
| Glucose | $1.3 \times 10^{-5}$ |
| Inulin | $0.4 \times 10^{-5}$ |
| Albumin | $9.0 \times 10^{-8}$ |

EXAMPLE 13 (COMPARISON)

The following composition is placed in a polypropylene lens mould (0.2 mm thick) and polymerised for three hours under irradiation from 365 nm UV lamps.
Macromonomer A (see hereinafter) 60 parts
Benzoin methyl ether 0.3 parts
Isopropyl acetate 40 parts After demoulding, discs of the polymer were extracted at 37° C in PF5060 for three hours, then placed in isopropyl acetate (IPAc) overnight, then in a 50/50 (v/v) mix of IPAc-isopropyl alcohol (IPA) for three hours and into fresh IPA for a further three hours. The discs were dried overnight at 30° C. in a vacuum oven on filter paper before being hydrated in saline for several days. The resulting clear polymeric discs had a water content of 0.9% and a sessile contact angle of 87 degrees.

This part of example 13 illustrates the preparation of macromonomer A. Into a 250 mL round bottomed flask is placed 24.18 g of commercially available hydroxypropyl terminated polydimethylsiloxane of molecular weight 947, and 10.76 g of distilled trimethylhexamethylene diisocyanate. The mixture is shaken vigorously for several minutes and then, 0.04 g of dibutyltin dilaurate is added. The mixture is then shaken for a further five minutes; before being stirred overnight. A mild exotherm is observed during the first hour. To the reaction mixture is then added 103.30 g of commercially available PFPE of approximate molecular weight 2000 (hydroxyl number 55.40), and 0.10 g of dibutyltin dilaurate. After again being vigorously shaken for several minutes, the mixture is stirred overnight. An infrared spectrum is run to confirm the disappearance of the isocyanate peak. To the mixture is then added 7.92 g of freshly distilled isocyanatoethyl methacrylate. The flask is shaken vigorously and the mixture stirred overnight. Again, an infrared spectrum is run to confirm the disappearance of isocyanate. The resulting viscous liquid has the formula given in Formula 11 above.

EXAMPLE 14 (Comparison)

The following composition is placed in a polypropylene flat mould (0.2 mm thick) and polymerized for 3 h under irradiation from 365 nm UV lamps.

| | |
|---|---|
| Macromonomer B (see hereinafter) | 70 parts |
| Isopropyl acetate | 30 parts |
| Benzoin methyl ether | 0.3 parts |

After demoulding, the resulting discs are extracted at 37° C. in PF5060 for three hours, then placed in isopropyl acetate (IPAc) overnight, then in a 50/50 (v/v) mix of IPAc/isopropyl alcohol (IPA) for three hours and into fresh IPA for a further three hours. The discs are dried overnight at 30° C. in a vacuum oven on filter paper before being hydrated in saline for several days. After extraction and hydration, the water content is measured and found to be 2.4%.

This part of example 14 illustrates the synthesis of macromonomer B. Into a 250 mL round bottomed flask is placed 150 g of hydroxy terminated PFPE (commercially available from Minnesota Mining and Manufacturing Company, St Paul, MN, USA, under the trade name Z-DOL) of hydroxyl number 55.4 and 11.49 g of freshly distilled isocyanatoethyl methacrylate. After shaking the mixture vigorously for several minutes, 0.09 g of dibutyltin dilaurate is added. The mixture is then shaken for a further 5 minutes before being stirred overnight. An infrared spectrum is recorded to confirm the disappearance of the isocyanate peak. 15.58 g of distilled trimethylhexamethylene diisocyanate is added to the mixture, which is then stirred for several minutes and then 0.10 g of dibutyltin dilaurate is added. After again being vigorously shaken for several minutes, the mixture is stirred overnight. To the mixture is then added 14.81 g of dry polyethylene glycol (molecular weight 200). After stirring the mixture for several minutes, 0.12 g of dibutyltin dilaurate is added. The flask is shaken vigorously and the mixture stirred overnight. Again, an infrared spectrum is recorded to confirm the disappearance of the isocyanate. This procedure produces a mixture containing a high proportion of the desired macromonomer of Formula 10. This macromonomer is purified using the following technique:

To 3.0 g of the crude macromonomer in a vial is added 15 ml of a 50:50 v/v mixture of trichlorotrifluoroethane/t-butyl acetate. After suspending the macromonomer in this solvent mix by shaking, the mixture is transferred to a separatory funnel. The solution is washed with 10 ml of distilled water. The bottom layer is collected in a round-bottomed flask and the solvent removed under high vacuum. The residue is then suspended in 15 g of a perfluorinated alkane solvent PF5060 (available from Minnesota Mining and Manufacturing Company, St Paul, MN, USA). The top layer is retained and once again the solvent removed under high vacuum. This gives the purified macromonomer.

EXAMPLE 15

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| | parts |
|---|---|
| Macromonomer (1) | 100 |
| Isopropanol | 20 |
| Acetonitrile | 100 |
| Darocur | 0.3 |

The permeability of the lens to a solution of BSA was monitored by the U.V. spectroscopic technique. After 24 hours the absorbance reading was $A_{280}$=0.250. After hydration the water content of the lens was measured to be 40.0% (w/w).

EXAMPLE 16

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| | parts |
|---|---|
| Macromonomer (1) | 100 |
| Acetic acid | 120 |
| Darocur | 0.3 |

The permeability of the lenses to a solution of BSA was monitored by the U.V. spectroscopic technique. After 24 hours the absorbance reading for the lens was $A_{280}$=0.559. After hydration the water content of the lens was measured to be 30.9% (w/w).

EXAMPLE 17

The following formulations were placed in flat polypropylene lens moulds (0.2 mm thick, 20 mm diameter) and polymerised for 3 hours over the irradiation generated from a U.V. lamp at a wavelength of 365 nm. All parts are by weight.

| | A (parts) | B (parts) |
|---|---|---|
| Macromonomer (1) | 100 | 100 |
| Isopropanol | 20 | 20 |
| (p-fluorobenzene) methyl ketone | 100 | — |
| p-fluoromethoxy benzene | — | 100 |
| Darocur | 0.3 | 0.3 |

The permeability of the lenses to a solution of BSA was monitored by the U.V. spectroscopic technique. After 24 hours the absorbance reading for lens A was $A_{280}$=0.28 and lens B was $A_{280}$=0.65. After hydration the water content of lenses A and B was measured to be 28.0 and 31.0% (w/w) respectively.

EXAMPLE 18

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| Component | parts |
|---|---|
| Macromonomer (1) | 100 |
| Monocon 400 * | 50 |
| Isopropanol | 74.5 |
| Darocur | 0.3 |

The permeability of the lens to a solution of BSA was monitored by the U.V. spectroscopic technique. After 24 hours the absorbance reading for the lens was $A_{280}=0.19$. After hydration the water content of the lens was measured to be 31.0% (w/w).

*Monocon 400 is a polymerizable surfactant according to International patent application No. PCT/EP96/01256 with structure of macromonomer of formula (10), as described herein, wherein PEG is derived from a polyethyleneglycol of molecular weight 400.

EXAMPLE 19

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| | parts |
|---|---|
| Macromonomer (1) | 100 |
| Monocon 200 * | 51 |
| Isopropanol | 100 |
| Darocur | 0.3 |

The permeability of the lenses to a solution of BSA was monitored by the U.V. spectroscopic technique. After 24 hours the absorbance reading for lens A was $A_{280}=0.26$. After hydration the water content of the lens was measured to be 32% (w/w).

*Monocon 200 is a polymerizable surfactant according to International patent application No. PCT/EP96/01256 with structure of macromonomer of formula (10), as described herein, wherein PEG is derived from a polyethyleneglycol of molecular weight 200.

EXAMPLE 20

The following formulations were placed in flat polypropylene lens moulds (0.2 mm thick, 20 mm diameter) and polymerised for 3 hours over the irradiation generated from a U.V. lamp at a wavelength of 365 nm. All parts are by weight.

| | A (parts) | B (parts) |
|---|---|---|
| Macromonomer (1) | 100 | 100 |
| Isopropanol | 43 | 7 |
| Acetonitrile | 100 | 79 |
| Zonyl FS-300 | 21 | 20 |
| Darocur | 0.3 | 0.3 |

The permeability of the lenses to a solution of BSA was monitored by the U.V. spectroscopic technique. After 24 hours the absorbance reading for lens A was $A_{280}=0.28$ and lens B was $A_{280}=0.32$. After hydration the water content of lenses A and B was measured to be 40.8 and 45.2% (w/w) respectively.

EXAMPLE 21

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| | parts |
|---|---|
| Macromonomer (1) | 100 |
| Isopropanol | 100 |
| Cyclohexanone | 30 |
| Darocur | 0.3 |

The permeability of the lenses to a solution of BSA was monitored by the U.V. spectroscopic technique. After 24 hours the absorbance reading was $A_{280}=0.52$. After hydration the water content of the lens was measured to be 50% (w/w).

EXAMPLE 22

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| Component | parts |
|---|---|
| Macromonomer (1) | 60.3 |
| 3-hexanol | 47.2 |
| Fluorad | 9 |
| Darocur | 0.3 |

The permeability of the lens to a solution of BSA was monitored by the U.V. spectroscopic technique. After 24 hours the absorbance reading for the lens was $A_{280}=0.57$. After hydration the water content of the lens was measured to be 45.7% (w/w).

EXAMPLE 23

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| Component | parts |
|---|---|
| Macromonomer (1) | 100 |
| (p-fluorobenzene) methyl ketone | 30 |
| Isopropanol | 100 |
| Darocur | 0.3 |

The permeability of the lens to a solution of BSA was monitored by the U.V. spectroscopic technique. After 24 hours the absorbance reading for the lens was $A_{280}=1.03$. After hydration the water content of the lens was measured to be 43.0% (w/w).

EXAMPLE 24

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| Component | parts |
|---|---|
| Macromonomer (1) | 100 |
| Cyclohexane | 10 |
| Isopropanol | 100 |
| Darocur | 0.3 |

The permeability of the lens to a solution of BSA was monitored by the U.V. spectroscopic technique. After 24 hours the absorbance reading for the lens was $A_{280}$=1.06. After hydration the water content of the lens was measured to be 48.0% (w/w).

EXAMPLE 25

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| Component | parts |
|---|---|
| Macromonomer (2) | 102 |
| Zonyl FS-300 | 120 |
| Isopropanol | 50.1 |
| trifluoroethanol | 30 |
| Darocur | 0.3 |

The permeability of the lens to a solution of BSA was monitored by the U.V. spectroscopic technique. After 24 hours the absorbance reading for the lens was $A_{280}$=0.36. After hydration the water content of the lens was measured to be 34.3% (w/w).

EXAMPLE 26

The following formulation, comprising macromonomer (1) and a hydrophilic comonomer, was placed in flat polypropylene lens moulds (0.2 mm thick, 20 mm diameter) and polymerised for 3 hours over the irradiation generated from a U.V. lamp at a wavelength of 365 nm. All parts are by weight.

| | A |
|---|---|
| Macromonomer (1) | 0.505 |
| HEMA | 0.100 |
| Acetonitrile | 0.400 |
| Isopropanol | 0.035 |
| Darocur | 0.3 |

The permeability of the lens to a solution of BSA was monitored by the U.V. spectroscopic technique. After 24 hours the absorbance reading for the lens was $A_{280}$=0.322. After hydration the water content of the lens was measured to be 45% (w/w).

EXAMPLE 27

The following formulations were placed in flat polypropylene lens moulds (0.2 mm thick, 20 mm diameter) and polymerised for 3 hours over the irradiation generated from a U.V. lamp at a wavelength of 365 nm. All parts are by weight.

| | A | B |
|---|---|---|
| Monocon 400 * | 0.511 | 0.504 |
| Isopropanol | 0.504 | 0.504 |
| HEMA | 0.106 | 0.501 |
| Darocur | 0.3 | 0.3 |

*For Monocon 400 definition see example 18. The permeability of the lenses to a solution of BSA was monitored by the U.V. spectroscopic technique. After 24 hours the absorbance reading for lens A was $A_{280}$=0.157 and lens B was $A_{280}$=0.227. After hydration the water content of lenses A and B was measured to be 43 and 41% (w/w) respectively.

EXAMPLE 28

The following formulation was placed in flat polypropylene lens moulds (0.2 mm thick, 20 mm diameter) and polymerised for 3 hours over the irradiation generated from a U.V. lamp at a wavelength of 365 nm. All parts are by weight.

| | A |
|---|---|
| Macromonomer (1) | 0.406 |
| HEMA | 0.121 |
| Monocon 400 * | 0.205 |
| Isopropanol | 0.304 |
| Darocur | 0.3 |

*For Monocon 400 definition see example 18. The permeability of the lens to a solution of BSA was monitored by the U.V. spectroscopic technique. After 24 hours the absorbance reading for the lens was $A_{280}$=0.164. After hydration the water content of the lens was measured to be 31% (w/w).

EXAMPLE 29

The following formulations were placed in flat polypropylene lens moulds (0.2 mm thick, 20 mm diameter) and polymerised for 3 hours over the irradiation generated from a U.V. lamp at a wavelength of 365 nm. All parts are by weight. Macromomoner (X) in this example is a macromonomer of formula I wherein n is 2.9.

| | A | B |
|---|---|---|
| Macromonomer (X) | 0.500 | 0.255 |
| Isopropanol | 0.248 | — |
| Cyclohexanol | — | 0.118 |
| Trifluoroethanol | 0.422 | 0.298 |
| Darocur | 0.3 | 0.3 |

The permeability of the lenses to a solution of BSA was monitored by the U.V. spectroscopic technique. After 24 hours the absorbance reading for lens A was $A_{280}$=0.64 and lens B was $A_{280}$=0.33. After hydration the water content of lenses A and B was measured to be 33 and 28% (w/w) respectively.

The claims defining the invention are as follows:

1. A porous polymer polymerized from monomers comprising macromonomers having one or more perfluoropolyether units, and using porogens during polymerization,
   wherein polymerization starts from a co-continuous microemulsion and displays a discrete phase during or at the end of polymerization, the discrete phase forming a interpenetrating network, and
   wherein the water contents of the polymer, when fully equilibrated with water, is above 5 weight percent.
2. A polymer manufactured from monomers comprising macromonomers having one or more perfluoropolyether units polymerized in a solvent which forms a homogeneous solution with the monomer components, wherein the solution displays a discrete phase during or at the end of polymerization, the discrete phase forming a interpenetrating network, and wherein the water contents of the polymer, when fully equilibrated with water, is above 5 weight percent.

3. A porous polymer according to claim 1 wherein the perfluoropolyether units are of formula PFPE $$-OCH_2CF_2O\ (CF_2CF_2O)_x(CF_2O)_yCF_2CH_2O-\quad\text{(PFPE)}$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000.

4. A porous polymer according to claim 1 wherein the macromonomer is of formula (I):

$$Q\text{-}(PFPE\text{-}L)_{n-1}\text{-}PFPE\text{-}Q \quad\text{(I)}$$

wherein

Q may be the same or different and is a polymerizable group,

PFPE is a moiety of formula PFPE:

$$-OCH_2CF_2O(CF_2CF_2)_x(CF_2O)_yCF_2CH_2O-\quad\text{(PFPE)}$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000, L is a difunctional linking group; and n is at least 1.

5. A porous polymer according to claim 1 wherein the macromonomer is of formula (II):

$$Q\text{-}B\text{-}(L\text{-}B)n\text{-}T \quad\text{(II)}$$

wherein

Q may be the same or different and is a polymerizable group,

L is a difunctional linking group;

n is at least 1;

each B may be the same or different and is a difunctional block of molecular weight in the range of from 100 to 4000 and wherein at least one B is a perfluorinated polyether of formula (PFPE);

PFPE is a moiety of formula PFPE:

$$-OCH_2CF_2O\ (CF_2CF_2)_x(CF_2O)_yCF_2CH_2O-\quad\text{(PFPE)}$$

wherein the $CF_2CF_2O$ and $CF_2O$ units may be randomly distributed or distributed as block(s throughout the chain and wherein x and y may be the same or different such that the molecular weight of the perfluorinated polyether is in the range of from 242 to 4,000, and T is a univalent terminal group which is not polymerisable by free radicals but which may contain other functionality.

6. A porous polymer according to claim 1 wherein the macromonomer is of formula (III)

$$Q\text{-}PFPE\text{-}L\text{-}M\text{-}L\text{-}PFPE\text{-}Q \quad\text{(III)}$$

wherein

Q may be the same or different and is a polymerizable group,

PFPE is a moiety of formula PFPE:

$$-OCH_2CF_2O(CF_2CF_2O)_x(CF_2O)_yCF_2CH_2O-\quad\text{(PFPE)}$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 4,000, L is a difunctional linking group;

M is a residue from a difunctional polymer or copolymer comprising silicone repeat units of formula IV having a molecular weight preferably in the range of from 180 to 6000 and end functionality as described herein

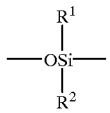

(IV)

wherein $R^1$ and $R^2$ may be the same or different and are selected from the group consisting of hydrogen, alkyl, aryl, halosubstituted alkyl and the like.

7. An article comprising a porous polymer as claimed in claim 1.

8. An article according to claim 7 which is an ophthalmic device.

9. An article according to claim 8 which is a contact lens.

10. An article according to claim 7 which is a membrane.

11. A process for the production of a porous polymer of claim 1 comprising the steps of:

i) forming a mixture comprising a polymerizable component and an organic solvent wherein the polymerizable component comprises at least one macromonomer having at least one perfluoropolyether unit;

ii) polymerizing said mixture wherein immediately after the polymerization of said mixture at least a substantial proportion of said organic solvent is in the form of a discrete phase arid wherein said discrete organic solvent phase forms an interpenetrating network throughout the mixture or is dispersed throughout the mixture; and iii) removing the discrete organic solvent phase.

12. A process according to claim 11 wherein the organic solvent is diisopropyl ether.

13. A process for producing a porous polymer of claim 1 comprising the steps of:

1) dispersing a porogen in a continuous monomer component phase wherein said continuous monomer component phase comprises at least one monomer having at least one perfluoropolyether unit and wherein said porogen is an optionally substituted poly(alkylene) glycol;

2) thereafter polymerising the continuous monomer phase; and 3) removing the porogen from the porous polymer.

14. A process according to claim 13 wherein the porogen is polypropylene glycol.

15. An article comprising a porous polymer obtainable according to the process of claim 11.

16. An article comprising a porous polymer obtainable according to the process of claim 13.

17. An article according to claim 15 which is a contact lens.

18. An article according to claim 16 which is a contact lens.

* * * * *